United States Patent
Yonge, III et al.

(10) Patent No.: US 8,745,137 B2
(45) Date of Patent: Jun. 3, 2014

(54) HYBRID NETWORKING SIMPLE-CONNECT SETUP USING PROXY DEVICE

(75) Inventors: Lawrence W. Yonge, III, Summerfield, FL (US); Sidney B. Schrum, Ocala, FL (US); Richard E. Newman, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 13/420,144

(22) Filed: Mar. 14, 2012

(65) Prior Publication Data

US 2012/0239744 A1 Sep. 20, 2012

Related U.S. Application Data

(60) Provisional application No. 61/452,306, filed on Mar. 14, 2011.

(51) Int. Cl.
*G06F 15/16* (2006.01)

(52) U.S. Cl.
USPC .......................................................... 709/204

(58) Field of Classification Search
CPC ............ H04L 12/2803; H04L 12/2834; H04L 12/2835; H04L 41/0803; H04L 41/0806
USPC ......................................... 709/218, 220, 204
See application file for complete search history.

(56) References Cited

U.S. PATENT DOCUMENTS

| | | | |
|---|---|---|---|
| 5,343,512 A * | 8/1994 | Wang et al. .................... | 455/410 |
| 6,130,896 A | 10/2000 | Lueker et al. | |
| 6,272,551 B1 | 8/2001 | Martin et al. | |
| 6,483,852 B1 | 11/2002 | Jacquet et al. | |
| 6,523,696 B1 * | 2/2003 | Saito et al. ..................... | 709/223 |
| 6,947,736 B2 * | 9/2005 | Shaver et al. ................. | 455/424 |
| 7,113,763 B2 | 9/2006 | Heinonen et al. | |
| 7,262,695 B2 | 8/2007 | Hicks | |
| 7,269,403 B1 | 9/2007 | Miao | |
| 7,349,325 B2 | 3/2008 | Trzeciak et al. | |
| 7,391,317 B2 | 6/2008 | Abraham et al. | |
| 7,440,443 B2 * | 10/2008 | Logvinov et al. ............. | 370/352 |
| 7,583,952 B2 | 9/2009 | Lee et al. | |
| 7,675,923 B2 * | 3/2010 | Rossi et al. .................... | 370/401 |
| 7,725,096 B2 | 5/2010 | Riveiro et al. | |

(Continued)

FOREIGN PATENT DOCUMENTS

| EP | 1686726 A1 | 8/2006 |
|---|---|---|
| WO | WO 2005057879 A1 * | 6/2005 |
| WO | WO 2010/073542 A1 | 7/2010 |

OTHER PUBLICATIONS

International Search Report and Written Opinion—PCT/US2012/029099—ISA/EPO—May 10, 2012.

*Primary Examiner* — Ario Etienne
*Assistant Examiner* — Uzma Alam
(74) *Attorney, Agent, or Firm* — Mahamedi Paradice Kreisman LLP

(57) ABSTRACT

A simple connect setup function for hybrid networks is provided that allows a user to add devices optionally having a number of different network interfaces (e.g., that facilitate communications using different network technologies or protocols) to a hybrid network in a single, simplified operation that alleviates the need for the user to individually connect and/or configure a multitude of different network interfaces. The simple connect setup function also alleviates the need for the user to know on which devices the simple connect setup function must be activated for successful simple connect setup.

16 Claims, 9 Drawing Sheets

(56) References Cited

U.S. PATENT DOCUMENTS

| | | |
|---|---|---|
| 7,751,414 B2 | 7/2010 | Lee et al. |
| 8,406,167 B2 * | 3/2013 | Den Hartog et al. .......... 370/328 |
| 8,468,219 B2 | 6/2013 | Palm et al. |
| 2006/0173978 A1 * | 8/2006 | Palm et al. .................... 709/220 |
| 2007/0075843 A1 | 4/2007 | Riveiro et al. |
| 2007/0076666 A1 | 4/2007 | Riveiro et al. |
| 2007/0143489 A1 * | 6/2007 | Pantalone .................... 709/230 |
| 2007/0229231 A1 | 10/2007 | Hurwitz et al. |
| 2008/0037444 A1 | 2/2008 | Chhabra |
| 2008/0080380 A1 | 4/2008 | Lee et al. |
| 2008/0130640 A1 | 6/2008 | Hurwitz et al. |
| 2009/0122787 A1 * | 5/2009 | Huotari et al. ................ 370/352 |
| 2009/0156159 A1 | 6/2009 | Lim et al. |
| 2009/0252209 A1 | 10/2009 | Riveiro et al. |
| 2009/0323829 A1 | 12/2009 | Riveiro et al. |
| 2011/0035791 A1 * | 2/2011 | Prigent et al. .................... 726/6 |
| 2011/0060833 A1 * | 3/2011 | Nogawa ........................ 709/225 |
| 2011/0264909 A1 * | 10/2011 | Ejzak ............................ 713/153 |
| 2012/0315909 A1 * | 12/2012 | Nakamura et al. ............ 455/436 |

* cited by examiner

HYBRID NETWORKING SIMPLE-CONNECT SETUP USING PROXY DEVICE

CROSS-REFERENCE TO RELATED APPLICATIONS

This application claims the benefit under 35 USC 119(e) of the commonly owned U.S. Provisional Application No. 61/452,306 entitled "HYBRID HOME NETWORKING SIMPLE-CONNECT SETUP" filed on Mar. 14, 2011, the entirety of which is incorporated herein by reference. In addition, this application is related to co-pending and commonly owned U.S. patent application Ser. No. 13/420,420 entitled "HYBRID NETWORKING MASTER PASSPHRASE" filed on Mar. 14, 2012, and related to co-pending and commonly owned U.S. patent application Ser. No. 13/420,215 entitled "HYBRID NETWORKING SIMPLE-CONNECT SETUP USING FORWARDING DEVICE" filed on Mar. 14, 2012, the entireties of both of which are incorporated herein by reference.

TECHNICAL FIELD

The present embodiments relate generally to network technologies and specifically to hybrid networking solutions.

BACKGROUND OF RELATED ART

Increasingly, there is a desire by service providers and consumers to distribute high-quality digitally encoded content (e.g., data, voice, and video) to both stationary and mobile devices, and to enable and control through these devices a rich set of content-related services. However, there is currently not an integrated network solution that can enable such content-related services while also allowing for a user-friendly way to create and/or modify a network having multiple devices that operate according to different network technologies.

Existing hybrid networks, which may operate wirelessly and/or over hardwire connections, typically incorporate multiple network technologies (e.g., Wi-Fi, HomePlug AV, and Ethernet) that are based upon various different networking standards or protocols. Typically, the configuration, operation, and communication protocols of these different network technologies are created by different groups and thus may vary. More specifically, not only are the network connection setup procedures (e.g., for creating new networks, adding devices to an existing network, discovering connected devices, bridging to other devices/networks, and so on) associated with Wi-Fi, HomePlug AV, and Ethernet systems different from each other, devices operating according to one of these standards typically has difficulty connecting to (and thus communicating with) devices operating according to another of these standards without the use of bridging devices and/or complicated connection setup operations. From a user standpoint, it is desirable to have a single simplified procedure for setting up and/or modifying a hybrid network that employs a multitude of different networking technologies. It is also desirable for the hybrid network to function as a single, seamless network that integrates different network technologies in a manner that is entirely transparent to the user.

For example, before a device can exchange data with other devices on a hybrid network, the device first needs to join the network. If the device has multiple network interfaces (e.g., that allow the device to communicate with other devices using different network technologies such as Wi-Fi and HomePlug AV), then each of the device's multiple network interfaces typically joins a corresponding sub-network of the hybrid network, which in turn may require multiple network connection setup operations.

Both Wi-Fi and HomePlug AV network technologies support "simple connect setup" operations that can be used to create networks and/or to add devices to an existing network. For example, a user can use the simple connect setup operation to create a new network and/or to add one or more devices to an existing network by pressing, within some bounded time period, pushbuttons on two devices that are within range of one another and that share a common network interface technology. However, because the simple connect setup protocols typically vary between different network technologies, using the simple connect setup operation to join devices that communicate using different network technologies to a hybrid network typically requires the user to initiate multiple and/or different connect setup operations on the devices, which places an undue burden on the user.

Thus, it would be desirable for a user to be able to connect and/or add devices having multiple network technology interfaces and/or multiple devices having different network technology interfaces to a hybrid network in a more user-friendly manner.

SUMMARY

In accordance with the present embodiments, a simple connect setup mechanism is provided that allows a user to form hybrid networks and/or add devices having a number of different network interfaces (e.g., that facilitate communications using different network technologies or standards) to an existing hybrid network in a single, simplified operation that alleviates the need for the user to individually connect and/or configure a multitude of different network interfaces. More specifically, for some embodiments, a single user input (e.g., a pushbutton or other suitable user interface) is provided on a device that, when activated by the user, automatically connects the device to the hybrid network and to its corresponding applicable sub-networks (e.g., to Wi-Fi and HomePlug AV networks incorporated within the hybrid network) without requiring the user to have knowledge of which network technologies each connected device and/or soon to be connected device employs. For some embodiments, an existing member of the hybrid network may act as a proxy device if the add device and the join device are not able to communicate directly. For other embodiments, an existing member of the hybrid network may act as a forwarding device to facilitate the exchange of simple connect setup messages between the add device and the join device if the add device and the join device are not able to communicate directly. For such other embodiments, the forwarding device may not need to be a hybrid device having network interfaces operating according to different network technologies.

BRIEF DESCRIPTION OF THE DRAWINGS

The present embodiments are illustrated by way of example, and not by way of limitation, in the figures of the accompanying drawings and in which like reference numerals refer to similar elements and in which.

DETAILED DESCRIPTION

Figure 1A:
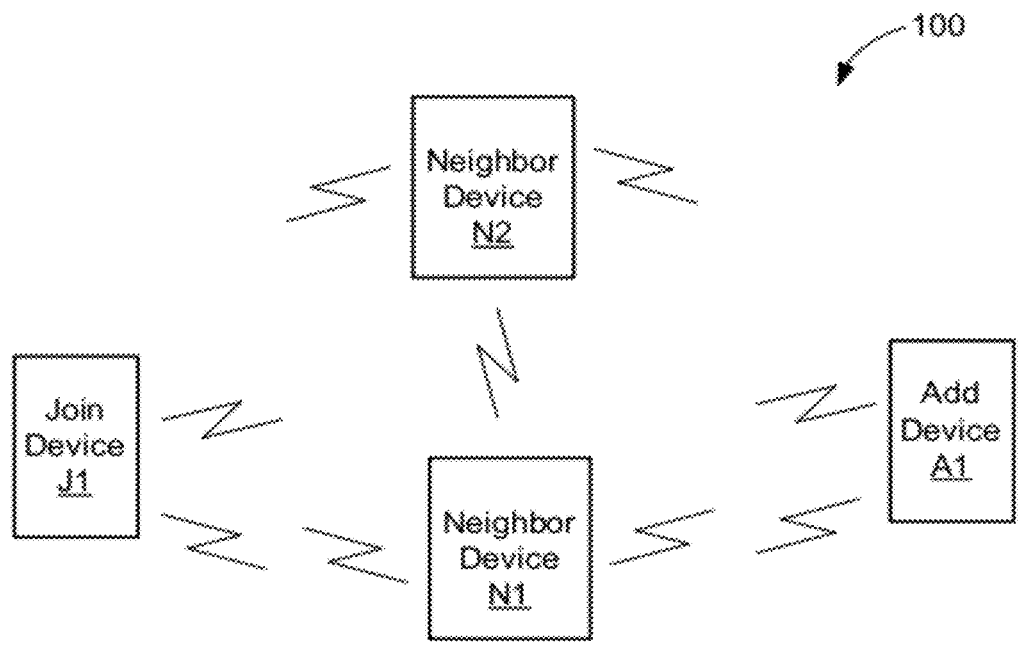
FIG. 1A is a block diagram of an exemplary network environment within which the present embodiments may be implemented.

A method and apparatus for joining devices having one or more network interfaces of the same technology, devices having multiple network interfaces of different technologies, and/or multiple devices having different network interface technologies to a secure hybrid network are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. The term "bus" includes both wired and wireless communication technologies, and does not depend on the number of devices connected to a communication medium. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather includes within its scope all embodiments defined by the appended claims.

As used herein, a Wi-Fi device may communicate with other Wi-Fi devices via a Wireless Local Area Network (WLAN). The terms Wi-Fi and WLAN can include communications governed by the IEEE 802 family of standards, Bluetooth, HiperLAN (a set of wireless standards, comparable to the IEEE 802.11 standard, used primarily in Europe), and other technologies having relatively short radio propagation range. Thus, the terms "Wi-Fi device" and "WLAN device" are interchangeable in this disclosure, and all refer to devices that have network interfaces that allow for communications governed by the IEEE 802 family of standards, Bluetooth, HiperLAN, and other technologies having relatively short radio propagation range.

Further, it is noted herein that the term HomePlug AV refers to a collection of standards developed by the HomePlug Powerline Alliance and a collection of standards developed by the IEEE 1901 standards group (e.g., as described in the HomePlug family of standards and the IEEE 1901 family of standards) for applications such as in-home distribution of TV, gaming and Internet access, as well as for smart power meters and in-home communications between electric systems and appliances. The HomePlug AV (HPAV) standards, which may also be referred to herein as Powerline Communications (PLC) standards, allow existing home electrical wiring to be used to facilitate communications between various in-home devices and/or to facilitate connecting to the Internet. Thus, the terms "HomePlug AV device" and "PLC device" are interchangeable in this disclosure, and both refer to devices that have network interfaces that allow for communications governed by the PLC standards and/or various HomePlug standards (e.g., HomePlug 1.0, HomePlug AV, HomePlug AV2, and so on).

In accordance with the present embodiments, a simple connect setup function for hybrid networks is provided that allows a user to add devices having a number of different network interfaces (e.g., that facilitate communications using different network technologies or standards) to a hybrid network in a single, simplified operation that alleviates the need for the user to individually connect and/or configure a multitude of different network interfaces. More specifically, for some embodiments, a single user input (e.g., a pushbutton or other suitable user interface) is provided on a device that, when activated by the user, automatically connects the device to the hybrid network and to its corresponding applicable sub-networks (e.g., to Wi-Fi and HomePlug AV networks incorporated within the hybrid network) without requiring the user to have knowledge of which network technologies each connected device and/or soon to be connected device employs.

For purposes of discussion herein, the term "pushbutton" may refer to any button, switch, touch, swipe, or other suitable user interface that when activated causes an associated device to commence network connection setup operations. Further, as used herein, the term "join device" refers to a device that is not currently a member of a network but that has entered a "join state" (e.g., in response to activation of the device's pushbutton) that allows the device to commence simple connect setup operations to join the network. The term "add device" refers to a device that is currently a member of the network and that has entered an "add state" (e.g., in response to activation of the device's pushbutton) that allows the device to facilitate the addition of another device (e.g., the join device) to the network. Thus, a device may become an add device if it is already a member of the network or if it was previously part of a non-default network and has not been reset, and a device may become a join device if it has never been part of a non-default network or if it has been reset.

For some embodiments, a user can form a new network using the simple connect setup function by activating a pushbutton on each of a number of devices that may or may not be able to directly communicate with each other. Also, for some embodiments, a user can join a first device to an existing network of which a second device is already a member by activating a pushbutton on each of the first and second devices, thereby allowing the second device to manage the addition of the first device to the network even if the first and second devices communicate using different network technologies and/or cannot communicate directly (e.g., because they are not within range of each other). The present embodiments are applicable to any network technology that supports or that can be configured to support "simple connect setup" operations.

Thus, devices configured in accordance with the present embodiments include a pushbutton that, when activated by a user, can initiate simple connect setup operations on every network interface that supports simple connect setup. More specifically, for Wi-Fi enabled devices (e.g., smart phones, laptops, tablets, and so on), activation of the pushbutton may initiate a "Wi-Fi Protected Setup" (also known as "Wi-Fi Simple Config") operation, while for HomePlug AV compliant devices, activation of the pushbutton may initiate the "Simple Connect" operation. The present embodiments also support Multimedia over Coax Alliance (MoCA) networking standards and other networking standards.

Advantages of the present embodiments include improving the user experience of hybrid networks by unifying simple connect setup protocols across different networking technologies and/or by providing backwards compatibility with legacy devices that are not equipped with setup protocols in accordance with the present embodiments.

The present embodiments described herein may implement simple connect setup operations using any number of techniques including, for example, "simple connect proxy device" techniques and/or "simple connect message encapsulation/decapsulation" techniques. For the simple connect proxy device technique, devices that are currently members of the network and that have the same type of network interface as the join device and can directly communicate with the join device may serve as the proxy device. After being designated as a proxy device by an original add device, the proxy device assumes control of the join operation and thereafter completes the simple connect setup operation for the join device. For the simple connect message encapsulation/decapsulation technique, a forwarding device having multiple network interfaces facilitates the exchange of simple connect setup messages between an add device and a join device that are unable to communicate directly with each other (e.g., because the add device is a WLAN device and the join device is a PLC device). The forwarding device does not serve as a proxy device but rather enables the add device and the join device to complete a simple connect setup operation themselves by forwarding messages between the add device and the join device. As used herein, the terms "forwarding device" and "relay device" both refer to devices that forward messages between an add device and a join device of a hybrid network. More specifically, as used herein, a forwarding device may include two or more network interfaces operating according to different network technologies, and includes circuitry and/or software modules to encapsulate and/or de-encapsulate messages to be forwarded between the add device and the join device; a relay device may include a network interface(s) operating according to a single network technology and relays messages between the add device and the join device, whereby the add and join devices may perform message encapsulation and/or de-capsulation operations. Further, for some embodiments, the forwarding device may be either a bridging device or a non-bridging device that may implement message encapsulation and de-capsulation.

As described in more detail below, the present embodiments may be used to form a network in a manner that is more simple and more efficient than conventional techniques. For example, if a simple connect pushbutton is pressed on both a Wi-Fi device and a hybrid Wi-Fi/PLC device, then a Wi-Fi network may be formed between the two devices. Then, after the original activation of the pushbuttons has timed out, if a user wants to add a PLC device to the network, the user may activate pushbuttons on the Wi-Fi device and the PLC device. In response thereto, the PLC interface on the hybrid Wi-Fi/PLC device and the PLC interface on the PLC device may then form a PLC network in accordance with the present embodiments. This is in contrast to conventional simple-connect setup operations for which activating the pushbutton on the Wi-Fi device does not allow the PLC device to join the network.

Figure 1B:
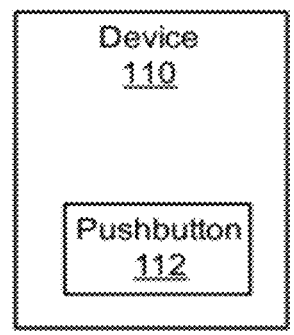
FIG. 1B is a simplified block diagram of a device having a simple connect setup pushbutton in accordance with the present embodiments.

An exemplary operation for joining a device to an existing network using the simple connect proxy device technique in accordance with the present embodiments is described below with respect to the exemplary block diagrams of FIGS. 1A-1C and the illustrative flow chart of FIG. 2A. FIG. 1A shows a network 100 within which the present embodiments may be implemented. Network 100 is shown to include a join device J1, an add device A1, and two neighbor devices N1 and N2. FIG. 1B shows a device 110 that is representative of join device J1, add device A1, and neighbor devices N1-N2. Device 110, which can be any mobile device, stationary device, home appliance, consumer electronics product, or other device capable of communicating with other devices using wireless and/or wired communication technologies, is shown to include a pushbutton 112 that may be used (e.g., activated by a user) to initiate simple connect setup operations in accordance with the present embodiments.

Each of devices of FIG. 1A can be any suitable device including, for example, a cell phone, PDA, tablet computer, laptop computer, wireless access point, modem, router, PLC network adaptor, internet protocol (IP) television, or other suitable device capable of communicating with other devices using Wi-Fi protocols, HPAV protocols, MoCA protocols, and/or Ethernet protocols. Further, it is noted that the Wi-Fi interfaces of such devices may communicate with each other on the WLAN sub-network (not shown for simplicity) of hybrid network 100, the PLC interfaces of such devices may communicate with each other on the PLC sub-network (not shown for simplicity) of hybrid network 100, and so on.

Figure 1C:
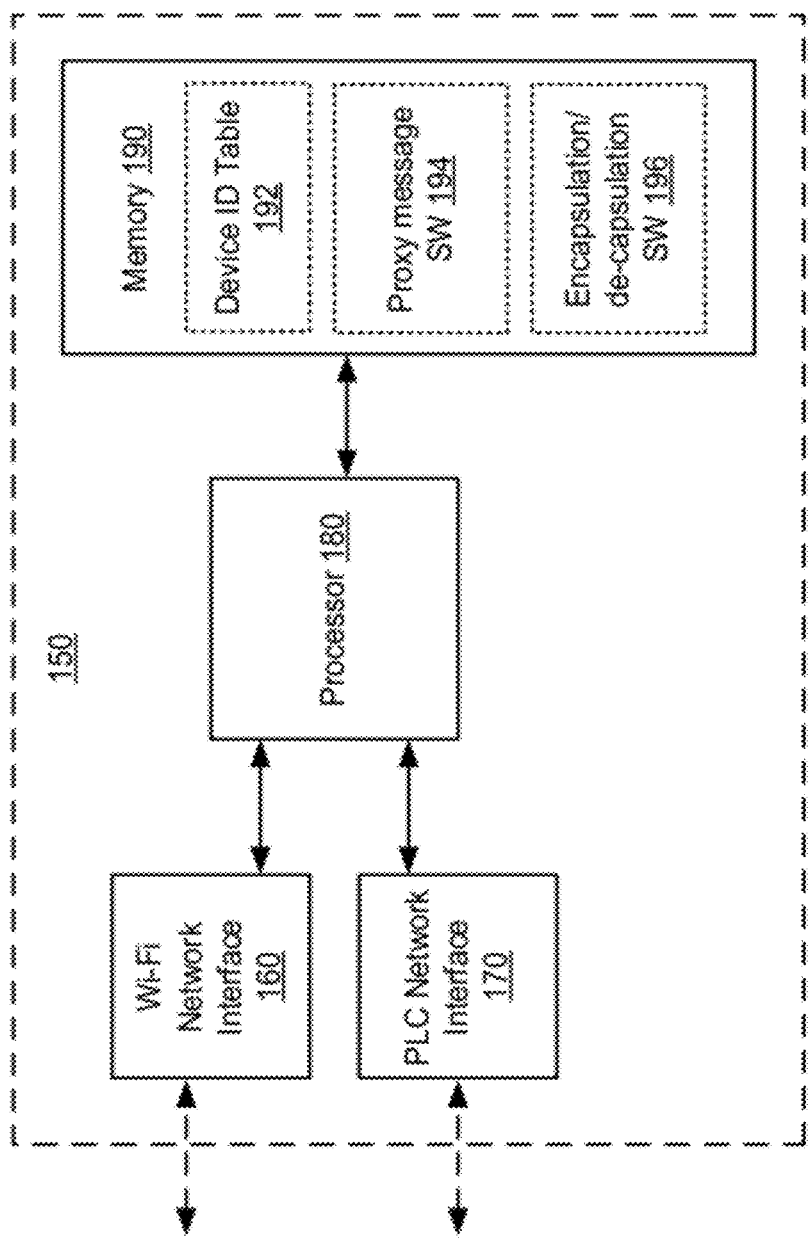
FIG. 1C is a block diagram of an exemplary one of the devices of the hybrid network of FIG. 1A.

FIG. 1C shows a device 150 that is one embodiment of a hybrid device of FIG. 1A. Device 150 includes a Wi-Fi network interface 160, a PLC network interface 170, a processor 180, and a memory 190. The Wi-Fi network interface 160 includes a receiver/transmitter circuit (not shown for simplicity) that can be used to exchange data with other devices associated with network 100 using Wi-Fi (i.e., WLAN) protocols. The PLC network interface 170 includes a receiver/transmitter circuit (not shown for simplicity) that can be used to exchange data with other devices associated with network 100 using HPAV and/or other PLC protocols.

Memory 190 includes a device ID table 192 that stores various device information (e.g., MAC addresses, protocols types, passwords, passphrases, keys, and/or PINs that may be used to establish secure links with other devices associated with network 100, to authenticate other devices associated with network 100, to facilitate the joining of device 150 to the network 100, and/or to facilitate the joining of other devices to the network 100.

Memory 190 also includes a non-transitory computer-readable medium (e.g., one or more nonvolatile memory elements, such as EPROM, EEPROM, Flash memory, a hard drive, and so on) that stores the following software modules:
- a proxy message software (SW) module 194 to facilitate the exchange of proxy messages in accordance with the present embodiments; and
- an encapsulation/de-capsulation software (SW) module 196 to facilitate the forwarding of messages between other devices using encapsulation and/or de-capsulation techniques.

Each software module includes instructions that, when executed by processor 180, cause the device 150 to perform the corresponding functions. The non-transitory computer-readable medium of memory 190 thus includes instructions for performing all or a portion of the operations of methods described below with respect to FIGS. 2A-2B.

Processor 180, which is coupled to Wi-Fi network interface 160, PLC network interface 170, and memory 190, can be any suitable processor capable of executing scripts or instructions of one or more software programs stored in device 150 (e.g., within memory 190). For example, processor 180 can execute proxy message software (SW) module 194 to facilitate the exchange of proxy messages in the manner described below with respect to FIG. 2A, and can execute encapsulation/de-capsulation software (SW) module 196 to facilitate the forwarding of messages between other devices using encapsulation and/or de-capsulation techniques in the manner described below with respect to FIG. 2B.

Note that embodiments of Wi-Fi devices and PLC devices discussed herein may be similar to the hybrid device 150 of FIG. 1C, except for the number and/or type of network interfaces. For example, embodiments of Wi-Fi devices may include all the elements of hybrid device 150 except for the PLC interface 170, while embodiments of PLC devices may include all the elements of hybrid device 150 except for the Wi-Fi interface 160. In addition, one or more of the add and/or join devices described herein may not include the proxy message SW module 194 or the encapsulation/de-capsulation SW module 196.

Figure 2A:
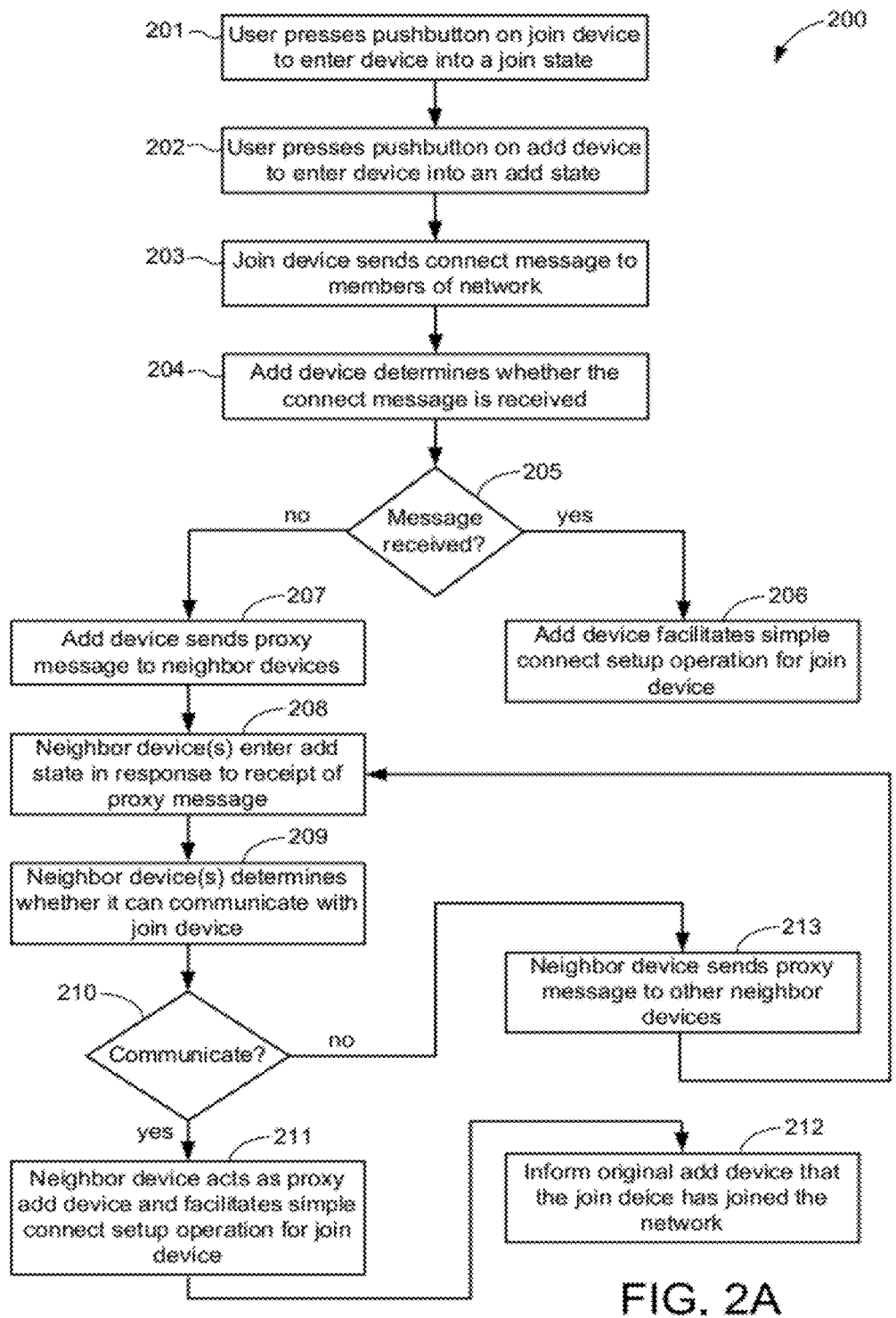
FIG. 2A is an illustrative flow chart depicting an exemplary operation for joining a device to the network of FIG. 1A using a proxy device in accordance with the present embodiments.

An exemplary simple connect setup operation using one or more proxy add devices in accordance with the present embodiments is now described with respect to the illustrative flow chart of FIG. 2A. Referring also to FIGS. 1A-1B, a user first activates the pushbutton 112 on join device J1 to cause the device J1 to enter a join state (201). The user also activates (either concurrently or sequentially within some predetermined time period) the pushbutton 112 on the add device A1 to cause the device A1 to enter an add state (202). Note that the user may instead activate the pushbutton on the add device, and then activate the pushbutton on the join device, or simultaneously activate the pushbuttons on the add and join devices. Thus, although steps 201 and 202 are depicted in FIG. 2A as being performed sequentially, their order may be reversed, or alternately performed at the same time. Also note that the predetermined time period may be specified by the device manufacturer, a standards body, a vendor, and/or by the user.

In response to entering the join state, the join device J1 advertises that it seeks to join the network 100 by sending (e.g., broadcasting) a simple connect message to each of the devices that are members of network 100 (203). For some embodiments, if the add device is a hybrid device that includes multiple network interfaces (e.g., Wi-Fi and PLC), the add device A1 may broadcast a separate connect message for each corresponding network protocol (e.g., for Wi-Fi and PLC). The add device A1, which is already a member of network 100, determines whether it receives the simple connect message from the join device J1 (204).

If the add device A1 receives the simple connect message from the join device J1, as tested at 205, then the add device A1 facilitates the simple connect operation that allows the join device J1 to join the network 100 (206). Conversely, if the add device A1 does not receive the simple connect message, which indicates that the add device A1 cannot communicate directly with the join device J1 (e.g., because the join device J1 is not within wireless range of add device A1 and/or because the add and join devices communicate using different network technologies), then the add device A1 sends proxy connect messages to neighboring devices N1 and N2 (which are also members of the network 100) (207). In response thereto, each neighboring device N1/N2 in receipt of the proxy connect message from add device A1 enters the add state and thereafter operates as if its simple connect setup pushbutton 112 has been activated by the user (208). Thus, in accordance with the present embodiments, once the neighbor device N1/N2 enters the add state in response to receiving the proxy connect message from the original add device A1, the neighbor device N1/N2 acts as a proxy add device to facilitate the addition of the join device J1 to the network 100.

For some embodiments, immediately after entering the add state, the original add device A1 may send proxy connect messages to neighbor devices N1/N2 without first determining whether it has received the simple connect setup message from the join device J1. This may reduce the time to complete the join operation, for example, if the original add device A1 is ultimately unable to receive the simple connect setup message from the join device J1 (e.g., because the neighbor device(s) N1 and/or N2 have already entered the add state and therefore are already acting as proxy add devices).

Referring again to FIG. 2A, each neighbor device N1/N2 that has entered the add state determines whether it can communicate directly with the join device J1 (209). If so, as tested at 210, then the neighbor device N1/N2 acts as a proxy add device and facilitates the simple connect operation to join the join device J1 to the network 100 (211). For some embodiments, when the join device J1 is successfully added to the existing network 100 by the proxy add device at 211, the proxy add device can inform the original add device A1 that the simple connect operation for joining the join device J1 to the network 100 is complete (212). This ability may be useful to alert the user when the join device J1 has successfully joined the network 100, and for determining that a "rogue" device has joined the network as described below.

Conversely, if the neighbor device N1/N2 cannot communicate directly with the join device J1, as tested at 210, then the neighbor device N1/N2 sends proxy connect messages to other neighbor devices (not shown for simplicity in FIG. 1A) that cause such other neighbor devices to enter the add state (213), and thereafter the setup operation continues at 208. In addition, for some embodiments, immediately after entering the add state, each neighbor device N1/N2 may send proxy connect messages to other neighbor devices without first determining whether it can communicate with the join device J1. This may reduce the time to complete the join operation, for example, if the original proxy add device N1/N2 is ultimately unable to receive the simple connect setup message from the join device J1. For one embodiment, the neighbor device N1/N2 may broadcast the proxy connect message to all members of the network regardless of whether it can communicate with the join device J1.

Further, for some embodiments, if the number of devices that have joined the network is greater than expected (e.g., based on the number of devices previously not members of the network but for which their pushbuttons were activated), then the user can be alerted that an unauthorized "rogue" device (e.g., not intended to be added to the network) may have joined the network. In response thereto, the user may be instructed to take remedial actions (e.g., to de-activate and then re-establish the network).

For the simple connect message encapsulation/decapsuation technique, the add device completes the simple connect operation without using a proxy device. If the join device and the add device have network interfaces corresponding to different network technologies, then the join device can generate simple connect messages that are "native" to its network technology, and also encapsulate the simple connect messages into a format that is native to (e.g., compatible with) the add device's network technology. A forwarding device having network interfaces that are compatible with the network technologies of both the add device and the join device may facilitate the protocol exchange between the add and join devices by de-capsulating the encapsulated simple connect messages received from the join device and then forwarding the resulting "native" simple messages to the add device. The forwarding device may also encapsulate response messages received from the add device and then forward the encapsulated response messages to the join device, which in turn may de-capsulate the response messages. Optionally, if the forwarding device is not within range of both the add device and the join device, then one or more other bridging device(s) can be used to complete forwarding of messages between the join and add devices.

More specifically, with the "simple connect message encapsulation/decapsulation" techniques in accordance with the present embodiments, encapsulation may be used to deliver simple-connect setup messages between device interfaces that are not on the same sub-network (e.g., interfaces operating according to different network protocols and/or standards), or alternately in two subnetworks that use the same network technology but for which the devices of one subnetwork cannot communicate with devices of the other subnetwork (e.g., when a PLC network in a house that is bridged through a Wi-Fi network to another isolated PLC network running on wires connected to a generator). Encapsulation is performed to allow simple connect messages to be forwarded through forwarding devices so that the simple connect setup protocol negotiation may be executed. Either the target device or the forwarding device can de-capsulate the encapsulated messages prior to re-transmission or processing.

In some embodiments, an IEEE 1905.1 Abstraction Layer Message Container format frame may be used to encapsulate the simple connect setup messages. Type-Length-Valve (TLV) encoding may be used to indicate both that the TLV value field contains an encapsulation message, and the network technology (e.g., HomePlug AV, Wi-Fi, MoCA, etc.) of the encapsulated message. Note that there is typically a unique type field value for each supported network technology. An example encapsulation frame format that may be used to encapsulate an HomePlug AV frame according to the present embodiments is shown below in Table 1:

TABLE 1

| DA (6 octets) | SA (6 octets) | 1905.1 Ethertype (2 octets) | Message Container Header (8 octets) | Type Field [HPAV encap. frame] (1 octet) | Length Field [HPAV MAC Frame length] (2 octets) | HPAV MAC Frame (variable) | Type Field [=0 = End of Message] (1 octet) | Length Field = 0 (2 octets) |
| --- | --- | --- | --- | --- | --- | --- | --- | --- |

For other embodiments, a common TLV type may be used for all encapsulated messages, and the format of the frame may be determined by inspection, or simply by "trial and error" (e.g., in which devices attempt to parse the message assuming the expected format). For another embodiment, EtherType encoding or other suitable protocol identifiers may be used to indicate that a frame contains an encapsulated message.

The format of encapsulated frames is specific to the network technology and is known to other devices in the hybrid network. Typically, the format is consistent with the network technology "MAC frame" format, and does not include PHY layer headers.

Figure 2B:
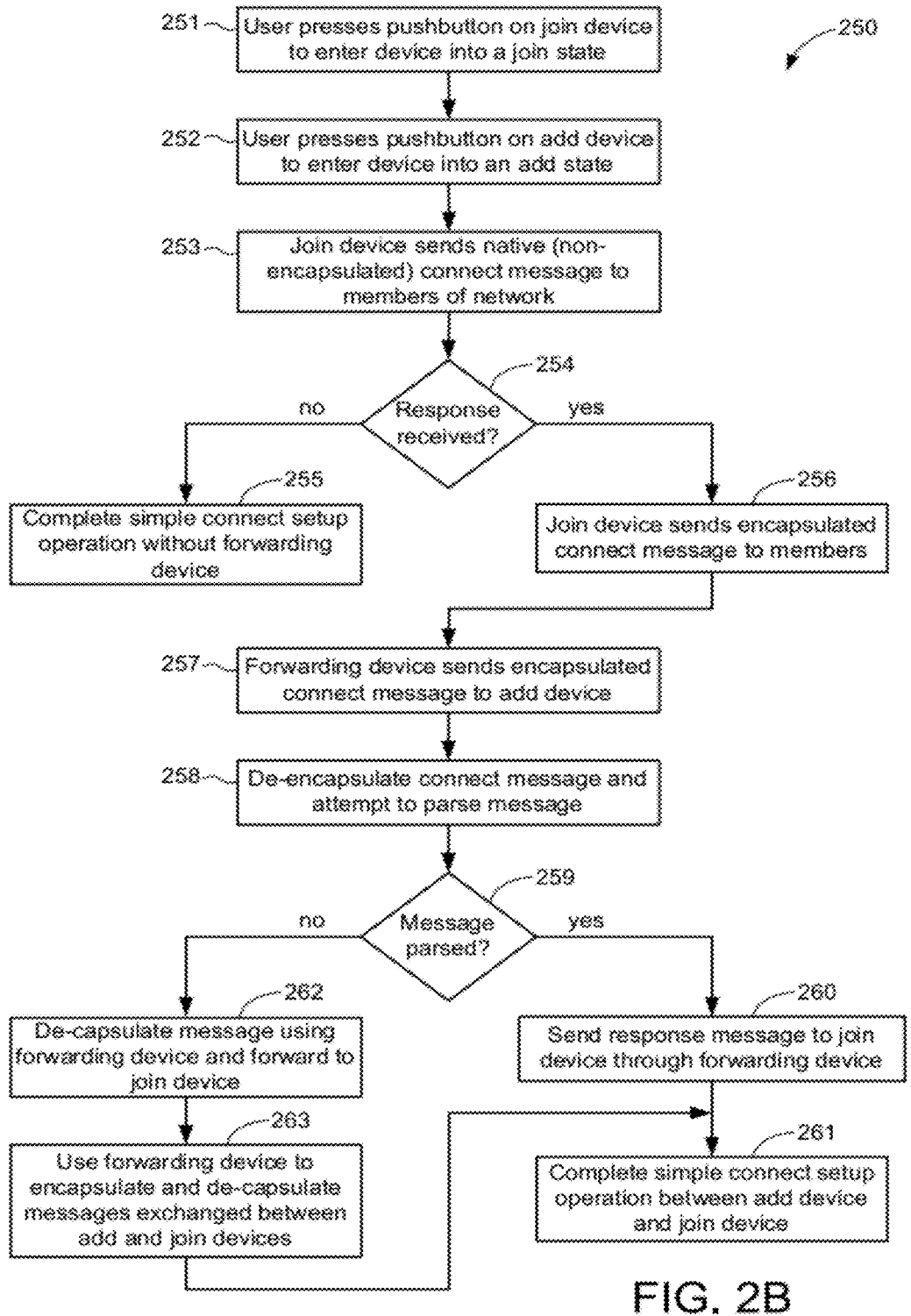
FIG. 2B is an illustrative flow chart depicting an exemplary operation for joining a device to the network of FIG. 1A using a forwarding (e.g., encapsulating/decapsulating) device in accordance with the present embodiments.

For some embodiments, two hybrid networking devices involved in the simple-connect setup operation perform the encapsulation and decapsulation of simple connect setup messages. An exemplary simple connect setup operation using encapsulation techniques in accordance with the present embodiments is now described with respect to the illustrative flow chart of FIG. 2B. Referring also to FIGS. 1A-1B, a user first activates the pushbutton 112 on join device J1 to cause the join device J1 to enter a join state (251). The user also activates (either concurrently or sequentially within some predetermined time period) the pushbutton 112 on the add device A1 to cause the device A1 to enter an add state (252). Note that the user may instead activate the pushbutton on the add device, and then activate the pushbutton on the join device, or simultaneously activate the pushbuttons on the add and join devices. Thus, although steps 251 and 252 are depicted in FIG. 2B as being performed sequentially, their order may be reversed, or alternately performed at the same time. Also note that the predetermined time period may be specified by the device manufacturer, a standards body, a vendor, and/or by the user.

In response to entering the join state, the join device J1 advertises that it seeks to join the network 100 by first sending (e.g., broadcasting) "native" non-encapsulated simple connect protocol exchange initiation messages to devices that are members of network 100 (253). If a member device (e.g., add device A1) attached to the same sub-network as the join device (and that has had its pushbutton activated) responds with a "native" non-encapsulated simple connect message, as tested at 254, then the simple connect setup protocol exchange may be completed without encapsulation and without forwarding messages through forwarding devices (255).

Conversely, if no response is received by the join device J1, as tested at 254 (which may indicate that the add device A1 that has recently had its pushbutton activated is not on the same sub-network as the join device J1), then the join device J1 generates and transmits an encapsulated simple setup message for each network technology supported by the hybrid network (256). Note that these messages may be transmitted using a "broadcast" MAC address.

For other embodiments, the join device J1 may transmit both the non-encapsulated and encapsulated simple connect setup messages at the same time.

A forwarding device, which for some embodiments may be one or more of neighbor devices N1-N2 having a first network interface on the same sub-network as the join device and having a second network interface on the same sub-network as the add device, forwards the encapsulated simple connect setup messages to the add device A1 (257). Note that broadcast messages, including simple connect setup initiation messages sent with a broadcast MAC address, are delivered to every device interface in the hybrid network 100.

Next, the add device A1 de-capsulates the encapsulated simple connect setup message and attempts to parse the message (258). If the add device A1 is able to parse the simple connect setup protocol initiation message, as tested at 259, then the add device A1 responds by generating and transmitting a response message using the simple connect protocol, using an encapsulation frame (260). For some embodiments, this message is sent with the unicast MAC address of the device that initiated the simple connect setup. Thereafter, the join device J1 and the add device A1 continue exchanging simple connect setup messages via the forwarding device using the network-technology-specific protocol and frame formats consistent with the response message until the simple connect setup is complete (261).

Conversely, if the add device A1 cannot parse the simple connect setup protocol initiation message, as tested at 259, then the forwarding device may de-capsulate the encapsulated message and forward the resulting native message to the join device J1 (262). Thereafter, the forwarding device may continue to encapsulate and de-capsulate messages exchanged between the add device A1 and the join device J1 to facilitate the forwarding of messages between the add device A1 and the join device J1 (263), which in turn allows for the completion of the simple connect setup operation between the join device J1 and the add device A1 (261). Note that for this example, the add device A1 and the join device J1 complete the simple connect setup operation without using a proxy device, and that the forwarding device merely facilitates the exchange of messages between the add device A1 and the join device J1.

Note that because both the initiating device (e.g., the join device) and the responding device(s) (e.g., the add device and/or any forwarding devices) may implement multiple network interfaces, and because the simple connect pushbutton may be activated by the user on more than two devices, multiple copies of the initiation message may be received by the responding devices, and therefore multiple responses may be transmitted and received by the initiating device. As a result, for some embodiments, the initiating device may respond only to the first response message and thereafter ignore and/or discard all subsequent responses.

Although the exemplary embodiment described above advantageously allows the forwarding devices to implement message forwarding operations without any additional software or device updates, it may not be interoperable with legacy devices (e.g., where the add device and/or join device do not have the ability to encapsulate and/or de-capsulate messages). Accordingly, for other embodiments, the forwarding devices may de-capsulate encapsulated simple connect setup messages before re-transmitting the messages, encapsulate non-encapsulated simple connect setup messages according to normal message routing, and forward without encapsulation or decapsulation non-encapsulated messages between sub-networks of the same network technology type. For such other embodiments, the de-capsulation may be performed only if the target device is attached to the same sub-network as the transmit interface and the sub-network is consistent with the network technology indicated in the encapsulation message; otherwise the encapsulated message is forwarded or discarded according to normal frame routing. If a broadcast encapsulation simple connect setup message is received, then the encapsulated message is forwarded the same as any broadcast message. In addition, for each network interface whose network technology is consistent with the network technology indicated in the encapsulation message, a copy of the de-capsulated message is also transmitted out the network interfaces. When forwarding devices transmit a de-capsulated message no cryptographic encoding is performed, as the originator of the message performs encryption, nonce generation, etc. as required by the simple connect setup protocol.

Further, note that the two embodiments described above may be used together to provide the best opportunity for success in joining devices to the network using simple connect setup. In short, forwarding devices forward encapsulated simple setup messages, encapsulate simple setup messages received that need to be forwarded to the destination device, and de-capsulate messages that are transmitted out a network interface (if the network interface is attached to the sub-network of the target device). Hybrid networking devices receive, decode, and respond to encapsulated and de-capsulated simple connect setup messages, and transmit encapsulated and non-encapsulated messages according to the location in the network of the intended recipients(s).

In addition, another embodiment may allow the simple connect setup operation to complete when the join and add devices are legacy devices implementing different network technologies if there is a hybrid networking device available in the network that can complete the simple connect protocol. For this embodiment, the hybrid networking device observes join advertisement requests from the join legacy device. If no response is observed after some time period, then the hybrid networking device transmits join advertisement request messages in the simple connect protocols that it supports (except for the protocol used for the observed request). Then, if the hybrid device receives a response to its join request, it enters the "add" state and completes the simple connect setup protocol with the first device.

One advantage of the simple connect message encapsulation via forwarding-device technique is that the forwarding device may be less complex than the proxy device used in the simple-connect proxy technique. However, the devices used in the forwarding-device technique may be more complex than the devices in the proxy technique because the devices need to be capable of performing multiple simple connect protocols (e.g., one simple connect protocol implemented for each network technology supported).

Various exemplary simple connect setup operations that may selectively use one or more proxy add devices in accordance with the present embodiments are described below with respect to FIGS. 3-7 in which distance is depicted in the horizontal direction and time is depicted in the vertical direction (with time increasing in the downward direction).

Figure 3:
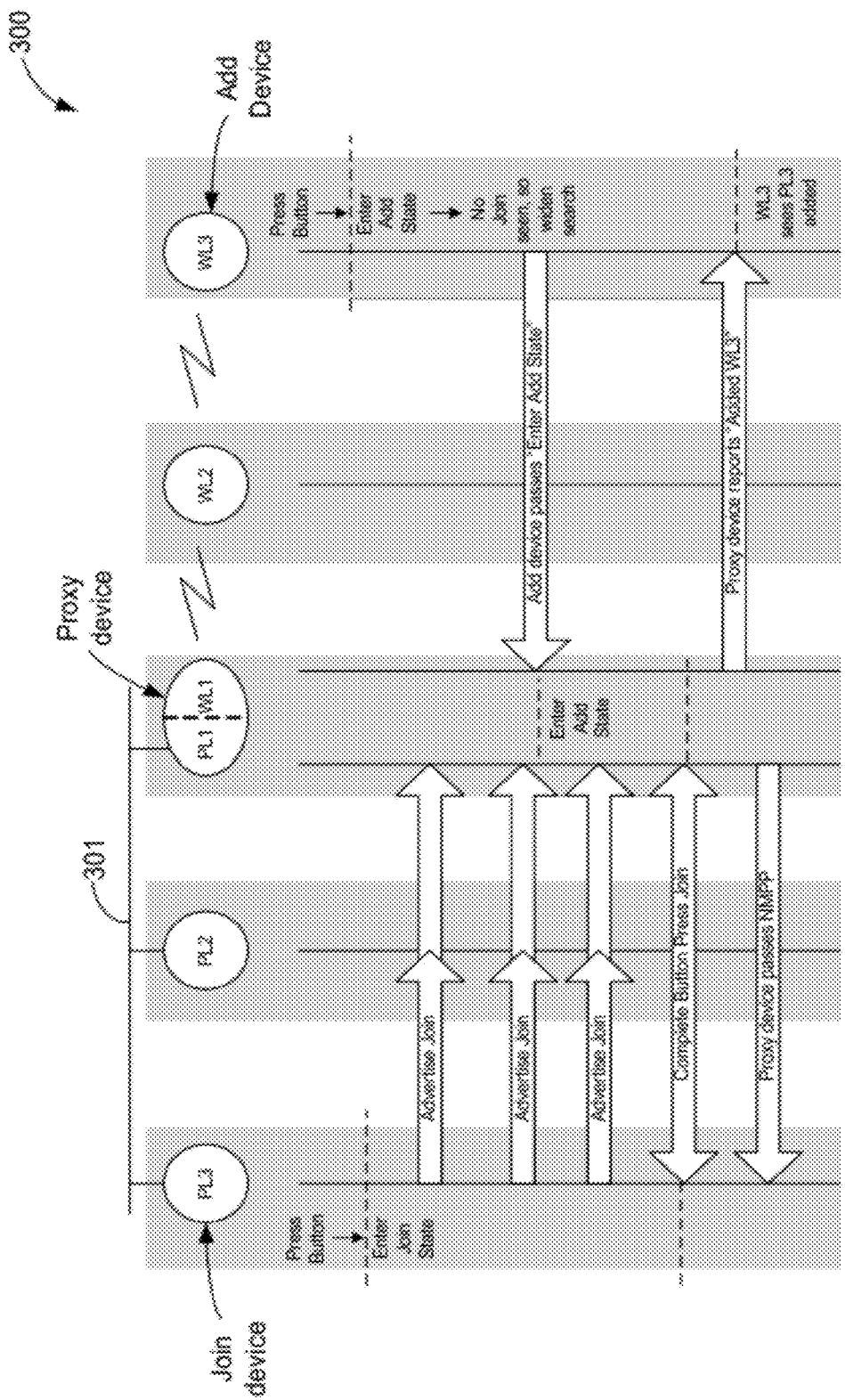
FIG. 3 is a sequence diagram illustrating message exchanges associated with adding a PLC device to an existing hybrid network using the simple-connect proxy technique in accordance with some embodiments.

FIG. 3 is a sequence diagram illustrating message exchanges associated with adding a PLC device having a PLC network interface to an existing hybrid network 300 using the simple-connect proxy technique in accordance with some embodiments. Network 300 is shown to include a number of member devices, including two Wi-Fi devices WL2 and WL3 each having a Wi-Fi network interface, a PLC device PL2 having a PLC network interface, and a PLC/Wi-Fi device PL1/WL1 having both PLC and Wi-Fi network interfaces. Note that PLC device interfaces PL1-PL3 are coupled to each other via a PLC sub-network 301.

For the example of FIG. 3, a PLC device PL3 is the join device, the Wi-Fi device WL3 is the add device, and the PLC/Wi-Fi device PL1/WL1 serves as the proxy add device. Referring also to FIG. 1B and the exemplary flow chart 200 of FIG. 2A, a user first presses the simple connect setup pushbutton 112 on the PLC join device PL3, which in response thereto enters the join state (201). The user also presses the simple connect setup pushbutton 112 (either concurrently or within some predetermined time period) on the Wi-Fi device WL3, which in response thereto enters the add state (202). As mentioned above, the user may instead activate the pushbutton on the add device, and then activate the pushbutton on the join device, or simultaneously activate the pushbuttons on the add and join devices. Also note that the predetermined time period may be specified by the device manufacturer, a standards body, a vendor, and/or by the user.

In response to entering the join state, the join device PL3 advertises to all other devices that it seeks to join the network 300 by sending or broadcasting a simple connect message to all devices that are members of network 300 (203). More specifically, for the example of FIG. 3, the PLC interface (not shown for simplicity) of join device PL3 sends simple connect messages to other devices indicating that it seeks to join the PLC sub-network 301 of network 300.

For this example, upon entering the add state, the Wi-Fi add device WL3 does not receive the simple connect message from the PLC join device PL3, and thus assumes that it cannot communicate directly with the join device PL3. In response thereto, the add device WL3 sends simple proxy connect messages to neighbor devices that are also members of the same sub-network (207). For this example, the neighbor PLC/Wi-Fi device PL1/WL1 can communicate with original Wi-Fi add device WL3 using the WLAN sub-network of network 300. In response thereto, neighbor device PL1/WL1 enters the add state and thereafter behaves as if its simple connect setup pushbutton were activated (208). The neighbor device PL1/WL1, which is able to communicate directly with the join device PL3 via the PLC sub-network, acts as a proxy add device and performs the simple connect setup operation to connect the join device PL3 to the PLC sub-network 301 of network 300 (211). Then, the proxy add device PL1/WL1 informs the original add device WL3 that the join device PL3 has joined the PLC sub-network (212). For some embodiments, the proxy device PL1/WL1 also sends proxy messages to its neighbor devices to cause them to enter the join state. Further, the proxy add device PL1/WL1 may pass Network Master Pass Phrase (NMPP) information to the join device PL3.

Further description of the NMPP is provided in the above-referenced and commonly owned U.S. Patent Application entitled "Hybrid Networking Master Passphrase," the entirety of which is incorporated herein by reference. More specifically, the network master passphrase provides a simple and unified authentication mechanism that allows a user to securely form and/or expand a hybrid network using devices that operate according to different network technologies using a single master passphrase, thereby advantageously improving a user's experience when creating and/or modifying hybrid networks by unifying password-based authentication and setup operations for devices having network interfaces that operate according to various different network technologies or communication protocols. For example, rather than requiring a user to enter a number of different technology-specific passwords into devices that communicate using different network technologies, the single master passphrase may be used to authenticate and connect various devices operating according to different network technologies to a hybrid network in a seamless and efficient manner.

Figure 4:
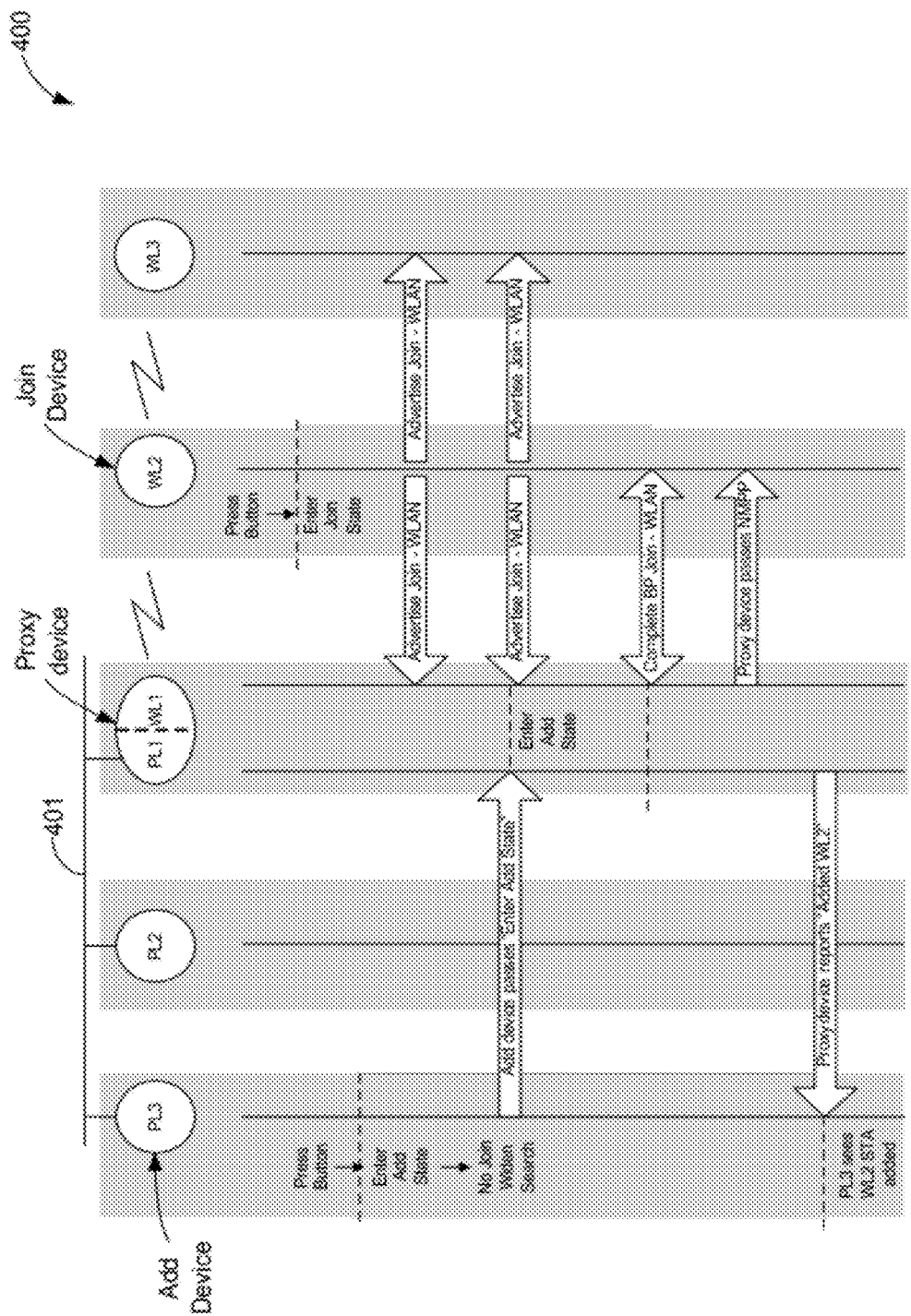
FIG. 4 is a sequence diagram illustrating message exchanges associated with adding a Wi-Fi device to an existing hybrid network using the simple-connect proxy technique in accordance with some embodiments.

FIG. 4 is a sequence diagram illustrating message exchanges associated with adding a Wi-Fi device having a Wi-Fi network interface to an existing hybrid network 400 using the simple-connect proxy technique in accordance with some embodiments. Network 400 is shown to include a number of member devices, including a Wi-Fi device WL3 having a Wi-Fi network interface, two PLC devices PL2 and PL3 each having a PLC network interface, and a PLC/Wi-Fi device PL1/WL1 having both PLC and Wi-Fi network interfaces. Note that PLC device interfaces PL1-PL3 are coupled to each other via a PLC sub-network 401.

For the example of FIG. 4, a Wi-Fi device WL2 is the join device, the PLC device PL3 is the add device, and the PLC/Wi-Fi device PL1/WL1 serves as the proxy add device. Referring also to FIG. 1B and the exemplary flow chart 200 of FIG. 2A, a user first presses the simple connect setup pushbutton 112 on the Wi-Fi join device WL2, which in response thereto enters the join state (201). The user also presses the simple connect setup pushbutton 112 (either concurrently or within some predetermined time period) on the PLC add device PL3, which in response thereto enters the add state (202). As mentioned above, the user may instead activate the pushbutton on the add device, and then activate the pushbutton on the join device, or simultaneously activate the pushbuttons on the add and join devices. Also note that the predetermined time period may be specified by the device manufacturer, a standards body, a vendor, and/or by the user.

In response to entering the join state, the join device WL2 advertises to all other devices that it seeks to join the network 400 by sending or broadcasting a simple connect message to all devices that are members of network 400 (203). More specifically, for the example of FIG. 4, the Wi-Fi interface (not shown for simplicity) of join device WL2 sends simple connect messages to other devices indicating that it seeks to join the WLAN sub-network of network 400.

For this example, upon entering the add state, the PLC add device PL3 does not receive the simple connect message from the Wi-Fi join device WL2, and thus assumes that it cannot communicate directly with the join device WL2. In response thereto, the add device PL3 sends simple proxy connect messages to neighbor devices that are also members of the same sub-network (207). For this example, the neighbor PLC/Wi-Fi device PL1/WL1 can communicate with original PLC add device PL3 using the PLC sub-network. In response thereto, neighbor device PL1/WL1 enters the add state and thereafter behaves as if its simple connect setup pushbutton were activated (208). The neighbor device PL1/WL1, which is able to communicate directly with the join device WL2 via the WLAN sub-network, acts as a proxy add device and performs the simple connect setup operation to connect the join device WL2 to the WLAN sub-network of network 400 (211). Then, the proxy add device PL1/WL1 informs the original add device PL3 that the join device WL2 has joined the WLAN sub-network (212). For some embodiments, the proxy device PL1/WL1 also sends proxy messages to its neighbor devices to cause them to enter the join state. Further, the proxy add device PL1/WL1 may pass Network Master PassPhrase (NMPP) information to the join device WL2.

Figure 5:
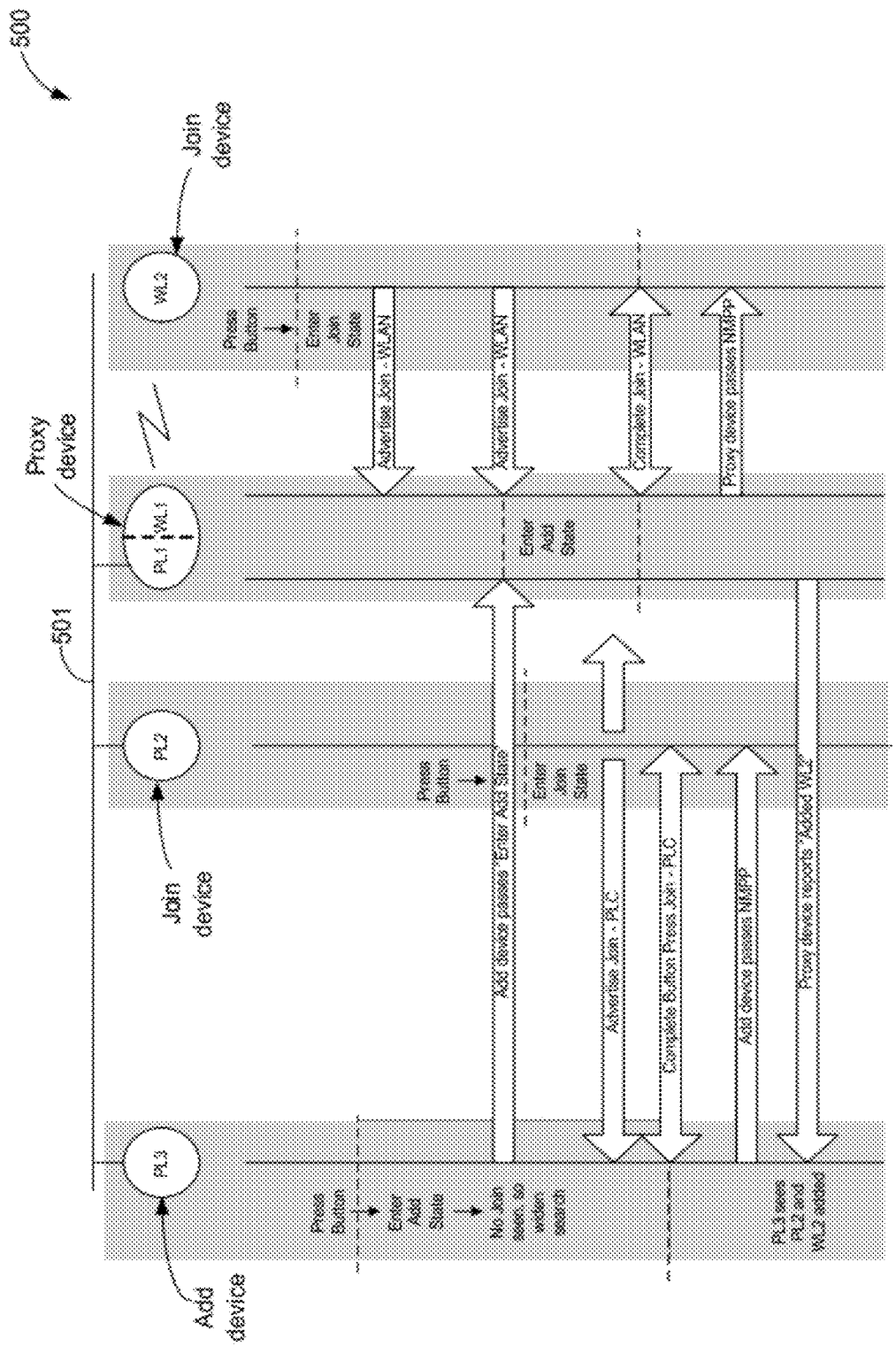
FIG. 5 is a sequence diagram illustrating message exchanges associated with adding a Wi-Fi device and a PLC device to an existing hybrid network using the simple-connect proxy technique in accordance with some embodiments.

FIG. 5 is a sequence diagram illustrating message exchanges associated with adding a Wi-Fi device and a PLC device to an existing hybrid network 500 using the simple-connect proxy technique in accordance with some embodiments. Network 500 is shown to include a number of member devices, including a PLC device PL3 having a PLC network interface, and a PLC/Wi-Fi device PL1/WL1 having both Wi-Fi and PLC network interfaces. Note that PLC device interfaces PL1-PL3 are coupled to each other via a PLC sub-network 501.

For the example of FIG. 5, a PLC device PL2 and a Wi-Fi device WL2 are both join devices, the PLC device PL3 is the add device, and the PLC/Wi-Fi device PL1/WL1 serves as the proxy add device. Referring also to FIG. 1B and the exemplary flow chart 200 of FIG. 2A, a user first presses the simple connect setup pushbutton 112 on the Wi-Fi join device WL2, which in response thereto enters the join state (201). The user also presses the simple connect setup pushbutton 112 on the PLC join device PL2, which in response thereto enters the join state (201). The user also presses the simple connect setup pushbutton 112 (either concurrently or within some predetermined time period) on the add device PL3, which in response thereto enters the add state (202). As mentioned above, the user may instead activate the pushbutton on the add device, and then activate the pushbutton on the join device, or simultaneously activate the pushbuttons on the add and join devices. Also note that the predetermined time period may be specified by the device manufacturer, a standards body, a vendor, and/or by the user.

In response to entering the join state, the join devices PL2 and WL2 advertise to all other devices that they seek to join the network 500 by sending or broadcasting a simple connect message to all devices that are members of network 500 (203). More specifically, for some embodiments, the join device PL2 sends a simple connect message to all member devices requesting connection to the PLC sub-network 501 of network 500, and the join device WL2 sends a simple connect message to all member devices requesting connection to the WLAN sub-network of network 500.

For this example, upon entering the add state, the add device PL3 receives the simple connect message from the PLC join device PL2 but does not receive the simple connect message from the Wi-Fi join device WL2. Thus, the add device PL3 completes the simple connect setup operation for the PLC join device PL2 (206), and assumes that it cannot communicate directly with the Wi-Fi join device WL2. In response thereto, the add device PL3 sends simple proxy connect messages to neighbor devices that are also members of the same sub-network (207). For this example, the neighbor device PL1/WL1 can communicate with original PLC add device PL3 using the PLC sub-network, and in response to the proxy connect message sent by original add device PL3, PLC/Wi-Fi device PL1/WL1 enters the add state and thereafter behaves as if its simple connect setup pushbutton 112 were activated (208). The neighbor device PL1/WL1, which is able to communicate directly with the Wi-Fi join device WL2, acts as a proxy add device and performs the simple connect setup for the Wi-Fi join device WL2 (211). Further, the original add device PL3 can pass NMPP information to the join device PL2, and the proxy add device PL1/WL1 can pass NMPP information to the join device WL2. Then, the proxy add device PL1/WL1 informs the original add device PL3 that the join device WL2 has joined the WLAN sub-network (212).

Figure 6:
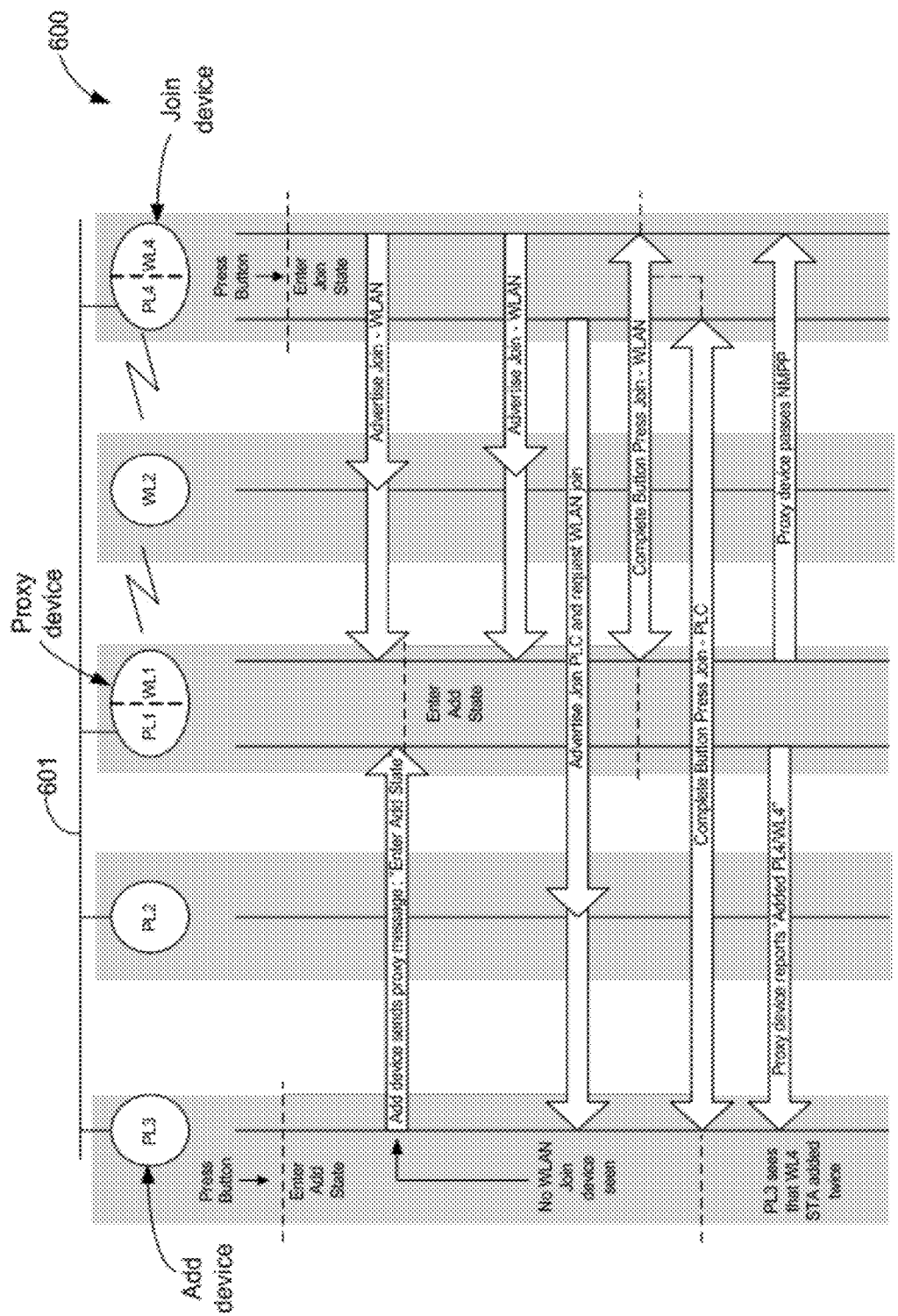
FIG. 6 is a sequence diagram illustrating message exchanges associated with adding a device having powerline communication (PLC) and Wi-Fi network interfaces to an existing hybrid network using a simple-connect proxy technique in accordance with some embodiments.

FIG. 6 is a sequence diagram illustrating message exchanges associated with adding a device having PLC and Wi-Fi network interfaces to an existing hybrid network 600 using the simple-connect proxy technique in accordance with some embodiments. Network 600 is shown to include a number of member devices, including a Wi-Fi device WL2 having a Wi-Fi network interface, two power line communication (PLC) devices PL2 and PL3 each having a PLC network interface, and one PLC/Wi-Fi device PL1/WL1 having both PLC and Wi-Fi network interfaces. Note that PLC device interfaces PL1-PL4 are coupled to each other via a PLC sub-network 601.

For the example of FIG. 6, a PLC/Wi-Fi device PL4/WL4 is the join device, the PLC device PL3 is the add device, and the PLC/Wi-Fi device PL1/WL1 serves as the proxy add device. Referring also to FIG. 1B and the exemplary flow chart 200 of FIG. 2A, a user first presses the simple connect setup pushbutton 112 on the join device PL4/WL4, which in response thereto enters the join state (201). The user also presses the simple connect setup pushbutton 112 (either concurrently or within some predetermined time period) on the add device PL3, which in response thereto enters the add state (202). As mentioned above, the user may instead activate the pushbutton on the add device, and then activate the pushbutton on the join device, or simultaneously activate the pushbuttons on the add and join devices. Also note that the predetermined time period may be specified by the device manufacturer, a standards body, a vendor, and/or by the user.

In response to entering the join state, the join device PL4/WL4 advertises to all other devices that it seeks to join the network 600 by sending or broadcasting a simple connect message to all devices that are members of network 600 (203). For the example of FIG. 6, the Wi-Fi interface (not shown for simplicity) of device PL4/WL4 sends connect messages to other device indicating that it seeks to join the WLAN sub-network of network 600, and the PLC interface (not shown for simplicity) of device PL4/WL4 sends simple connect messages to other devices indicating that it seeks to join the PLC sub-network of network 600, as depicted in FIG. 6.

For this example, upon entering the add state, the add device PL3 does not receive the WLAN simple connect message from the Wi-Fi interface of join device PL4/WL4, and thus assumes that it cannot communicate directly with the join device PL4/WL4. In response thereto, the add device PL3 sends simple proxy connect messages to neighbor devices that are also members of the same sub-network as the add device PL3 (207), as depicted in FIG. 6 as the add device passing the "enter add state" to neighbor device PL1/WL1. For this example, the neighbor devices PL2 and PL1/WL1 can communicate with original PLC add device PL3 using PLC technology. In response thereto, these neighbor devices PL2 and PL1/WL1 enter the add state and thereafter behave as if their simple connect setup pushbuttons 112 were activated (208). The neighbor device PL1/WL1, which is able to communicate directly with the join device PL4/WL4 via the WLAN sub-network, acts as a proxy add device and performs the simple connect setup operation to connect the join device PL4/WL4 to the WLAN sub-network of network 600 (211). Then, the proxy add device PL1/WL1 informs the original add device PL3 that the join device PL4/WL4 has joined the WLAN sub-network (212), and can also pass the NMPP to the join device PL4/WL4. For some embodiments, the neighboring device PL1/WL1 also sends proxy messages to its neighbor devices that may cause them to enter the add state.

Note that the add device PL3 does receive the simple connect setup message from the PLC interface of device PL4/WL4, and therefore can perform the simple connect setup operation to connect the join device PL4/WL4 to the PLC sub-network of network 600 (e.g., without using a proxy add device).

Figure 7:
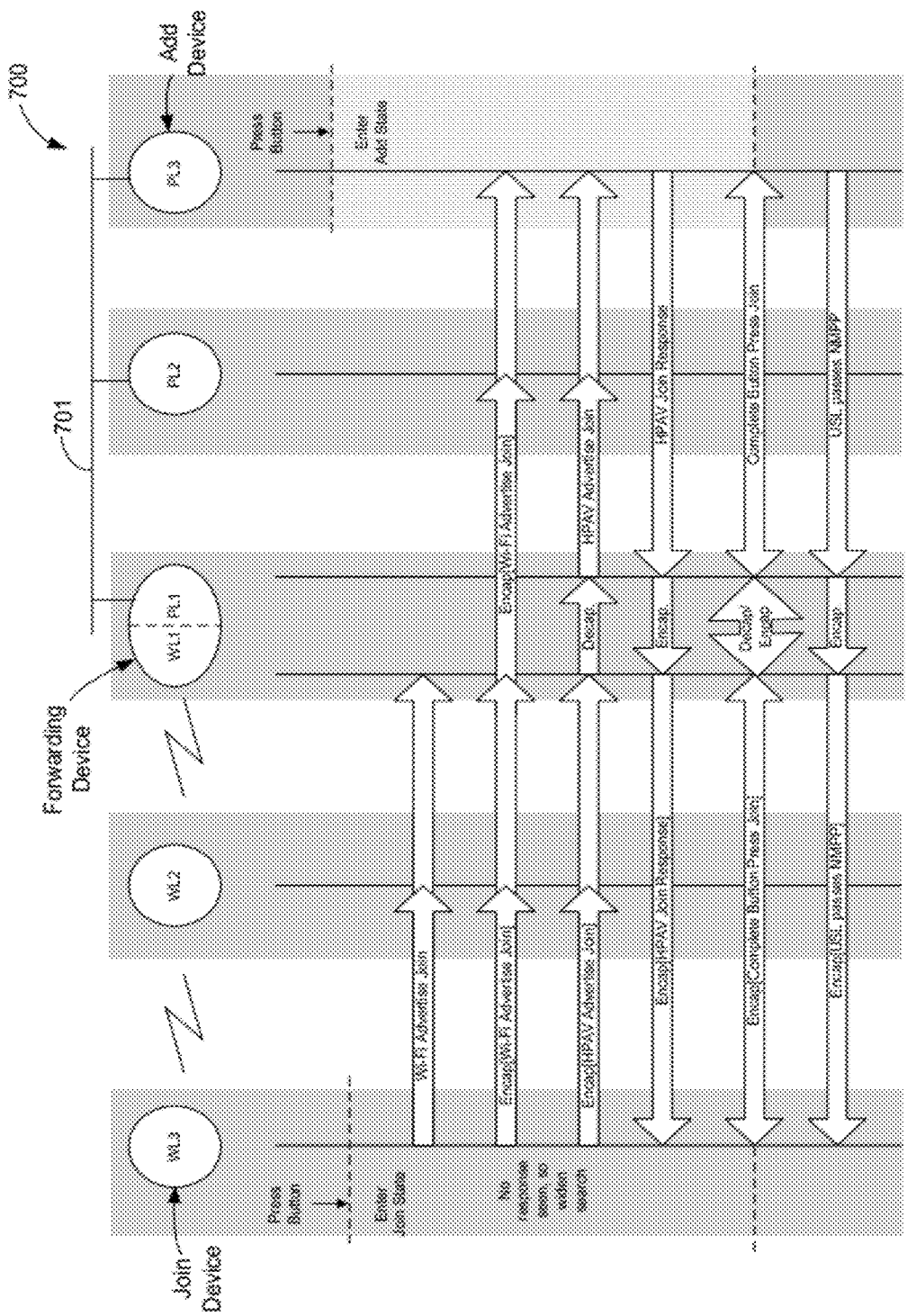
FIG. 7 is a sequence diagram illustrating message exchanges associated with adding a Wi-Fi device to an existing network using the simple connect message encapsulation/decapsulation techniques in accordance with some embodiments.

FIG. 7 is a sequence diagram illustrating a simple connect setup operation in which a forwarding device performs encapsulation and decapsulation so that a Wi-Fi device can be joined to an existing hybrid network 700 using a legacy PLC device executing HPAV simple connect setup operations in accordance with some embodiments. Network 700 is shown to include a number of member devices, including one Wi-Fi device WL2 having a Wi-Fi network interface, two PLC devices PL2 and PL3 each having a PLC network interface, and a Wi-Fi/PLC device WL1/PL1 having both PLC and Wi-Fi network interfaces. Note that PLC device interfaces PL1-PL3 are coupled to each other via a PLC sub-network 701.

For the example of FIG. 7, a Wi-Fi device WL3 is the join device, the PLC device PL3 is the add device, and the Wi-Fi/PLC device WL1/PL1 serves as the forwarding device. Referring also to FIG. 1B and the exemplary flow chart 200 of FIG. 2B, a user first presses the simple connect setup pushbutton 112 on the Wi-Fi join device WL3, which in response thereto enters the join state (251). The user also presses the simple connect setup pushbutton 112 (either concurrently or within some predetermined time period) on the PLC add device PL3, which in response thereto enters the add state (252). As mentioned above, the user may instead activate the pushbutton on the add device, and then activate the pushbutton on the join device, or simultaneously activate the pushbuttons on the add and join devices. Also note that the predetermined time period may be specified by the device manufacturer, a standards body, a vendor, and/or by the user.

In response to entering the join state, the join device WL3 advertises to all other devices that it seeks to join the network 700 by sending or broadcasting a native simple connect message to all devices that are members of network 700 (253). Because no response is received at 254, join device WL3 broadcasts encapsulated messages using both the Wi-Fi protocol and the HPAV protocol (256). The forwarding device WL1/PL1 forwards the encapsulated Wi-Fi message to add device PL3 (257), and the add device PL3 de-capsulates the message and attempts to parse the message (258). The forwarding device WL1/PL1 also de-capsulates the encapsulated HPAV message received from the join device WL3, and forwards the de-capsulated HPAV message to add device PL3 (262).

In response to the connect messages sent by the join device WL3, the add device PL3 sends a response message to the join device WL3 using the forwarding device WL1/PL1, which may encapsulate the response message (263). Thereafter, the forwarding device WL1/PL1 may continue to encapsulate and de-capsulate messages exchanged between the add device PL3 and the join device WL3 to facilitate the completion of the simple connect setup operation between the join device WL3 and the add device PL3 (261). Note that for the example of FIG. 7, the add device PL3 and the join device WL3 complete the simple connect setup operation without using a proxy device, and that the forwarding device WL1-PL1 merely facilitates the exchange of messages between the add device PL3 and the join device WL3.

In the foregoing specification, the present embodiments have been described with reference to specific examples. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

The present embodiments can be provided as a computer program product, or software, that may include a non-transitory machine-readable medium having stored thereon instructions. The machine readable medium may be used to program a computer system (or other electronic devices) to implement the present embodiments. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

What is claimed is:

1. A method, performed by an add device, for joining a join device to a hybrid network comprising a plurality of member devices including at least the add device and a proxy device, wherein the join device is not yet a member of the hybrid network, the method comprising:
    activating the add device to enter the add device into an add state, wherein the add device is to listen for a connect message from the join device;
    determining, in the add device, whether the connect message is received from the join device, wherein the connect message is communicated using a first communication protocol;
    when the connect message is received by the add device within a predetermined time period after the activating, then facilitating the joining of the join device to the hybrid network using the add device; and
    when the connect message is not received by the add device within the predetermined time period after the activating:
        sending a proxy connect message in a second communication protocol from the add device to the proxy device, wherein the first communication protocol is different than the second communication protocol, and wherein the first communication protocol and the second communication protocol are selected from powerline communication protocols, wireless protocols, and wired protocols; and
        allowing the proxy device to join the join device to the hybrid network using the second communication protocol.

2. The method of claim 1, wherein the add device is to send the proxy connect message to the proxy device even if the add device receives the connect message from the join device within the predetermined time period.

3. The method of claim 1, wherein the add device automatically broadcasts the proxy connect message to all of the member devices.

4. The method of claim 1, wherein the join device is to send the connect message upon being activated.

5. The method of claim 1, wherein the add device sends the proxy connect message via broadcasting.

6. A system for joining a join device to a hybrid network comprising a plurality of member devices including at least an add device and a proxy device, wherein the join device is not yet a member of the hybrid network, the system comprising:
    means for activating the add device to enter the add device into an add state, wherein the add device is to listen for a connect message from the join device;
    means for determining, in the add device, whether the connect message is received from the join device, wherein the connect message is communicated using a first communication protocol;
    means for facilitating the joining of the join device to the hybrid network using the add device when the connect message is received by the add device within a predetermined time period after the activating;
    means for sending a proxy connect message in a second communication protocol from the add device to the proxy device when the connect message is not received by the add device within the predetermined time period after the activating, wherein the first communication protocol is different than the second communication protocol; and means for allowing the proxy device to join the join device to the hybrid network using the second communication protocol if the connect message is not received by the add device within the predetermined time period after the activating.

7. The system of claim 6, wherein the first communication protocol and the second communication protocol are selected from powerline communication protocols, wireless protocols, and wired protocols.

8. The system of claim 6, wherein the add device is to send the proxy connect message to the proxy device even if the add device receives the connect message from the join device within the predetermined time period.

9. The system of claim 6, wherein the add device automatically broadcasts the proxy connect message to all of the member devices.

10. The system of claim 6, wherein the add device and the join device are activated by activating pushbuttons on the respective devices.

11. The system of claim 6, wherein the add device sends the proxy connect message via broadcasting.

12. A hybrid network including network interfaces employing first and second communication protocols that are different from each other, the network comprising:

a join device, having a network interface of the first communication protocol and not currently a member of the network, to selectively enter a join state and thereafter broadcast a simple connect message in the first communication protocol;

an add device, having a network interface of the second communication protocol and currently a member of the network, to selectively enter an add state and to:

facilitate the joining of the join device to the hybrid network when the simple connect message is received within a predetermined time period after entering the add state; and broadcast a proxy connect message, in the second communication protocol, when the simple connect message is not received within the predetermined time period; and a proxy add device, having a first network interface of the first communication protocol, having a second network interface of the second communication protocol, and currently a member of the network, to selectively enter the add state in response to the proxy connect message and thereafter facilitate joining of the join device to the network.

13. The network of claim 12, wherein the first communication protocol consists of a WLAN protocol, and the second communication protocol consists of a powerline communication (PLC) protocol.

14. The network of claim 12, wherein the first communication protocol consists of a powerline communication (PLC), and the second communication protocol consists of a WLAN protocol.

15. The network of claim 12, wherein the join device is to enter the join state in response to user activation of a pushbutton on the join device, and the add device is to enter the add state in response to user activation of a pushbutton on the add device.

16. The network of claim 12, wherein the proxy add device is to broadcast the proxy connect message to all other members of the network in response to entering the add state.

* * * * *